(12) United States Patent
Zamanzadeh et al.

(10) Patent No.: US 6,361,740 B1
(45) Date of Patent: Mar. 26, 2002

(54) SUSPENSION ARM AND LOAD BEAM FOR A DISK DRIVE

(75) Inventors: Mehrooz Zamanzadeh, Pittsburgh, PA (US); Ronald Noebe, Medina, OH (US)

(73) Assignee: Intri-Plex Technologies, Inc., Santa Barbara, CA (US)

( * ) Notice: Subject to any disclaimer, the term of this patent is extended or adjusted under 35 U.S.C. 154(b) by 0 days.

(21) Appl. No.: 09/575,057

(22) Filed: May 19, 2000

(51) Int. Cl.$^7$ ............................................. C22C 38/58
(52) U.S. Cl. ............................ 420/56; 420/73; 420/74; 148/325; 148/337
(58) Field of Search .................... 420/73, 74, 56; 148/325, 337

(56) References Cited

U.S. PATENT DOCUMENTS 5,643,530 A * 7/1997 Shingu et al. ................ 420/73

FOREIGN PATENT DOCUMENTS

FR          2551595 A * 8/1983 .................. 420/73

* cited by examiner

Primary Examiner—Deborah Yee

(74) Attorney, Agent, or Firm—Michael G. Petit

(57) ABSTRACT

A high-damping, corrosion resistant and substantially non-magnetic material having high damping properties has been developed for use in dynamic applications, specifically, a disk drive suspension arm and load beam. A disk drive assembly includes a disk having a readable and writeable surface, a motor operable for rotating the disk, and an actuator assembly that includes a transducer mounted on a load beam. The actuator assembly is operable for positioning the transducer in transducing relationship with the surface of the disk. When the disk spins, shear forces create turbulence in the fluidic medium adjacent to the surface of the disk. The turbulence exerts unbalanced and variable forces on the load beam, inducing vibrational motion therein. If the vibrational energy stored in the load beam is not quickly damped, the surface of the disk, load beam or transducer can be damaged. The present invention discloses alloy compositions of the form (14–21)Mn, (10–13)Cr, (0–6)Si, (4–10)Ni, (0–6)Co, and (0–0.2)N, the components being present in the range of percentages indicated with the balance being Fe. A preferred embodiment of an alloy in accordance with the present invention is Fe-15Mn-12Cr-3Co-3Ni-0.1N. The alloy has stainless steel-type properties and exhibits high damping characteristics. The alloy, which has both an austenitic and a ε-martensitic phase, can be melted, cast and rolled into sheets. Disk drive load beams cut from the sheet of alloy exhibit higher vibrational damping than materials currently used in the art.

9 Claims, 3 Drawing Sheets

SUSPENSION ARM AND LOAD BEAM FOR A DISK DRIVE

BACKGROUND OF THE INVENTION

1. Field of the Invention

The present invention relates to a composition of matter comprising an alloy having a high vibrational damping capacity and, in another aspect, to a disk drive actuator suspension arm comprised of the alloy.

2. Prior Art

At the present time, most computer systems store data on a disk drive. A disk drive includes inter alia a rotatable disk, and an actuator that moves a transducer over the surface of the disk. The transducer element is normally disposed within a small ceramic body affixed to a pivotally mounted load beam. In operation, in order for the transducer to sustain a transducing relationship with the disk, the transducer "flys" over the surface of the disk at an elevation of less than 0.001 mm. Electronic circuitry and servo-motor means enable the transducer to write data on, and read data from, a selected portion of the disk surface.

The high rotational speed of the disk creates fluid turbulence (or windage) in the volume of air adjacent thereto. This turbulence may impart a force upon the loadbeam, driving a resonant response. During operation, the loadbeam may be subjected to sudden acceleration due to actuator arm contact with travel-limiting "crash" stops. This contact may also initiate a resonant response in the loadbeam. In addition, the forces of acceleration, accompanying normal disk drive data-seeking operations, may generate a resonant response in the loadbeam. Non-repeatable runout (NRR) of the disk, coupled with the loadbeam's attempt to follow these eccentricities, may result in a resonant response. Disk drives sometimes operate in hazardous environments that may include being dropped from several inches. Such shock loads, when experienced during disk operation, may drive a resonant response in the loadbeam. Notwithstanding these excitations, the load beam, and the transducer attached thereto, must maintain the transducing relationship between the transducer and the surface of the disk at all times. If the resonant vibrations are not damped promptly and effectively, the elevational excursions of the load beam may cause damage to the surface of the disk, the transducer and/or the load beam, or the lateral excursions of the load beam may cause data track mis-registration and read-write errors. It is, therefore, desirable to provide a load beam, mounting arm and/or flexure having a high damping capacity.

Material damping occurs when repetitive deformation (vibration) of a material is dissipated through internal energy losses, usually in the form of heat. There are two basic types of damping behavior: inelastic and hysteretic. Inelastic damping occurs when there is a lag between the application of a stress and the resulting equilibrium value of the strain that is frequency and temperature dependent. Mechanisms that give rise to this type of damping, in metals, include the interaction of specific point defects with other point defects or dislocations, precipitation phenomena, and ordering effects.

Hysteretic damping, as used herein, is defined as frequency independent loss. Hysteretic damping materials exhibit a stress-strain behavior on loading that does not retrace the behavior on unloading. The area difference between the loading and unloading curves is then proportional to the energy loss for the material. While hysteretic damping is independent of frequency it is dependent on the applied stress (or strain amplitude). Materials that exhibit hysteretic damping are the preferred materials for applications where noise and vibration reduction are desired. Hysteretic damping occurs through boundary motion, for example, the motion of magnetic domains in ferromagnetic materials (magnetoelastic behavior) and the motion of twin boundaries (thermoelastic behavior).

The damping capacities of various metals are shown in FIG. 1. Exemplary of materials having excellent damping capacity are "shape memory" alloys such as NiTi (Nitinols), cast Mn—Cu alloys (Sonotron), and polymer matrix composites. Fe-based materials, other than pure Fe, exhibiting the highest specific damping capacity are Fe—Cr alloys, cast irons, and ferritic stainless steels. Fe—Cr—Al, ferritic stainless alloys (known as "Silentalloy") are reported to be high damping structural materials and were developed for use in corrosive environments. This type of alloy would would be ideal for fabricating a load beam for a disk drive actuator, meeting almost all requirements except for the fact that these materials are ferritic and thus, ferromagnetic. There is, therefore, a continuing need for a high damping, substantially non-magnetic material for use in disk drive actuator assemblies.

SUMMARY OF THE INVENTION

A high-damping, corrosion resistant and substantially non-magnetic material for a disk drive suspension arm and load beam having high damping properties is disclosed. A disk drive assembly includes a disk having a readable and writeable surface, a motor operable for rotating the disk, and an actuator assembly that includes a transducer mounted on a load beam. The actuator assembly is operable for positioning the transducer in transducing relationship with the surface of the disk.

The high rotational speed of the disk creates fluid turbulence (or windage) in the volume of air adjacent thereto. Such turbulence may impart a force upon the loadbeam, driving a resonant response. During operation, the loadbeam may be subjected to sudden acceleration due to actuator arm contact with travel- limiting "crash" stops. This contact may also initiate a resonant response in the loadbeam. The forces of acceleration resulting from normal disk drive data-seeking operations may generate a resonant response in the loadbeam. Non-repeatable runout (NRR) of the disk, coupled with the loadbeam's attempt to follow these eccentricities, may result in a resonant response within the loadbeam. Disk drives occasionally operate in hazardous environments that mayinclude being dropped from several inches. Such operating shock loads may drive a resonant response in the loadbeam. Notwithstanding these excitations, the load beam, and the transducer attached thereto, must maintain the transducing relationship between the transducer and the surface of the disk at all times. If the resonant vibrations are not damped promptly and effectively, the elevational excursions of the load beam may cause damage to the surface of the disk, the transducer and/or the load beam or result in data track mis-registration and read-write errors. It is, therefore, desirable to provide a load beam, or any similar flexure used in a disk drive, having a high damping capacity.

The present invention discloses alloy compositions of the form (14–20)Mn, (10–13)Cr, (0–6)Si, (4–10)Ni, (0-6)Co, and (0-0.2)N, the components being present in the range of percentages indicated with the balance being Fe. A preferred embodiment of the present invention is an alloy consisting essentially of Fe-15Mn-12Cr-3Co-3Ni-0.1N. The alloy has stainless steel-type properties and exhibits high damping characteristics. The alloy, which has both an austenitic and a ferrite phase, can be melted, cast and rolled into sheets. Disk drive load beams cut from the alloy sheet exhibit higher vibrational damping than materials currently used in the art.

It is an overall object of the invention to provide a composition of matter that is substantially non-magnetic and can be shaped to form a body characterized by, in combination, a high strength to weight ratio and a high vibrational damping capacity.

It is a particular object of the invention to provide an alloy which is suitable for fabricating a suspension mounting arm, loadbeam and/or flexure for a computer disk drive which meets the requirements demanded by the application. An exemplary list of typical specifications setting forth the requirements for a material suitable for use in manufacturing a suspension arm include:

1. be capable of being welded to 302/304 stainless steel;
2. have a high a strength to weight ratio;
3. be substantially non-magnetic;
4. be corrosion resistant;
5. have good internal damping properties to mute resonance modes given a forced impulse input;
6. be resilient and stable under dynamic load (up to 2500 g's) and heat (200° F.);
7. be formable into a sheet which preferably leaves little or no burr when sheared at a cutting clearance of 5% of material thickness;
8. does not cause excessive wear (with light lubrication) on tooling and other components used during normal stamping operations;
9. have an attractive, consistent, unblemished luster or matte finish. Ra<31$\mu$in;
10. not out-gas, flake or otherwise generate contamination when sealed in a disk drive for up to 15 years.

The most commonly used austenite stainless steel meets the performance criteria of 1, 3, 4, 8, 9, and 10. It is, therefore, a particular object of the present invention to provide a material for a disk drive suspension arm assembly having improved characteristics over austentitic stainless steel with respect to requirements numbered 2, 5, 6 and 7 above.

It is a further object of the invention to provide an alloy meeting the above objective and that, in addition, can be rolled into a sheet and shaped by a stamping machine.

It is yet a further object of the invention to provide an alloy that can be formed into a sheet that can be sheared by a stamping tool at a cutting clearance of 5% of the sheet thickness without leaving a burr.

The features of the invention believed to be novel are set forth with particularity in the appended claims. However the invention itself, both as to organization and method of operation, together with further objects and advantages thereof may be best be understood by reference to the following description of the invention in conjunction with the accompanying drawings.

DESCRIPTION OF THE PREFERRED EMBODIMENTS

Figure 1:
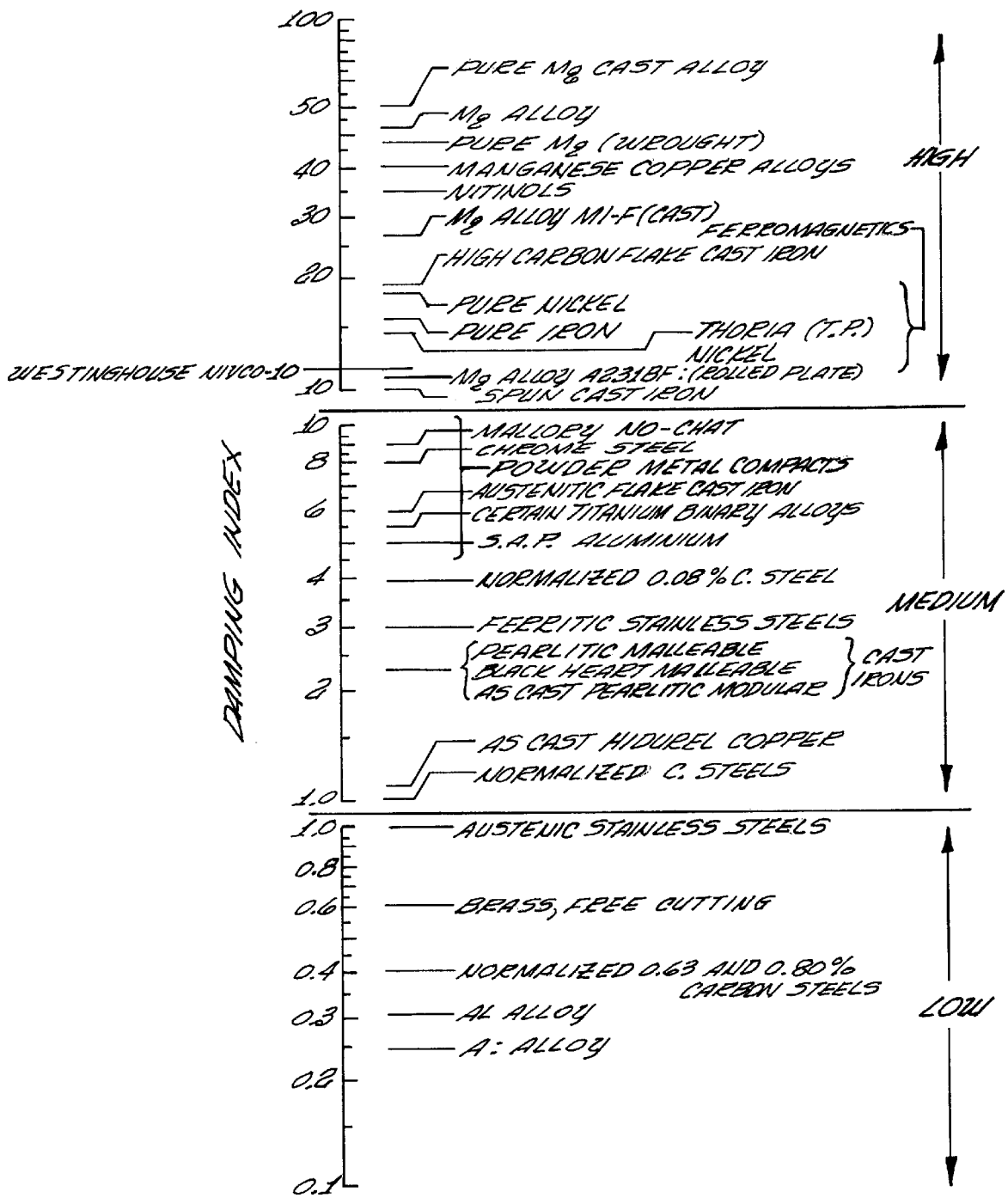
FIG. 1 is a table illustrating the relative damping characteristics of a variety of materials

Fe alloys containing 14–22% Mn undergo a $\gamma$-austenite to $\epsilon$-martensite phase transformation and have been shown to have relatively high damping capacities that correlates with the percentage of $\epsilon$-phase present in the alloy. The high-damping characteristic of these alloys has been attributed to the motion of the various twin and phase boundaries that exist in these materials. Fe—Mn steels have also attracted interest as a nonmagnetic structural steel. These alloys do not contain the body-centered-cubic ferromagnetic phases such as ferrite or $\alpha'$-martensite.

Fe—Mn—Si alloys undergo a similar martensitic reaction, but neither the Fe—Mn nor the Fe—Mn—Si alloys have good corrosion resistance or workability. This has resulted in limited development and characterization of more highly alloyed materials based on Fe—Mn—Si—Cr—Ni and sometimes Co. These more highly alloyed systems have been studied with respect to their microstructure (predominantly but not entirely $\gamma+\epsilon$), and the reversible martensitic reaction that occurs in these materials. However, they have not been studied with respect to their damping properties, though given the example of the Fe—Mn alloys, they should have enhanced damping characteristics compared to typical austenitic alloys.

An alloy that is predominantly $\gamma+\epsilon$, but which may also contain some ferrite, in structure, and contains sufficient alloying additions meets the other application requirements (corrosion resistance, strength, etc.) of a suspension arm for a disk drive, while not deterring twin boundary motion, which would adversely impact damping capacity. Mn, Co, and Ni are all austenite stabilizers and thus contribute desirable properties to the alloy structure. Cr is a ferrite stabilizer but is necessary for enhanced corrosion resistance. Ni and Co also provide additional strengthening of the alloy, these elements can be used to control the $M_s$ temperature. Co has also been reported to enhance alloy workability. N is also known to be a strong austenite stabilizer. Small amounts of N have been found to have beneficial effects on the overall mechanical properties of simple Fe—Mn alloys. Nitrogen also significantly increases the damping capacity of Fe—Mn by increasing the mobility of twin boundaries. The present invention discloses alloy compositions of the general form (14–20)Mn, (10–13)Cr, (0–6)Si, (4–10)Ni, (0–6)Co, and (0–0.2)N, the components being present in the range of percentages indicated with the balance being Fe. A method for making alloys having the general formula set forth above is now described.

Ferromagnetic iron is placed in a crucible and heated to 2450° F. in a 50 pound vacuum induction furnace. Once the alloying temperature is reached, the additional alloying elements are added to the molten iron in their respective desired amounts. The melt is then poured into a 50 pound cast iron ingot-shaped mold having a clay "hot top". The hot top serves to contain excess liquid alloy and enable the hot alloy to enter the ingot cavity as the ingot solidifies and shrinks. The cooled ingot is removed from the cast iron mold.

The ingot is then heated to a temperature of 2200° F. and held at this temperature for two hours to assure uniformity of temperature throughout the ingot. The ingot is then rolled on a two-high reversing rolling mill using working rolls having a 12 inch diameter. The rolled ingot is then squared and cross-rolled. The cross-rolling increases the width of the rolled sheet of alloy from about 3 inches to a desired 5.25 inches. Hot rolling is continued until the sheet attained a thickness of 0.120 inches. The elongated alloy sheets are then cut into manageable lengths and annealed at 1950° F. for 5 minutes and air-cooled. Following the air-cooling, the rolled alloy is immersed in a 10% nitric acid −2% hydrofluoric acid solution to remove oxidized surface material. Following acid treatment, the sheet of alloy is rolled to a thickness of 0.060 inches and reannealed at 1950° F. for 3 minutes, then air-cooled. The cooled sheet is then washed in the aforesaid acid solution then cold rolled to a thickness of 0.025 inches using a four-high rolling mill with 3 inch diameter work rolls and 12 inch diameter back-up rolls. The alloy sheet is again annealed at 1950° F. for 1minute, acid washed and cold rolled to a final product thickness of 0.010 inches.

Figure 2:
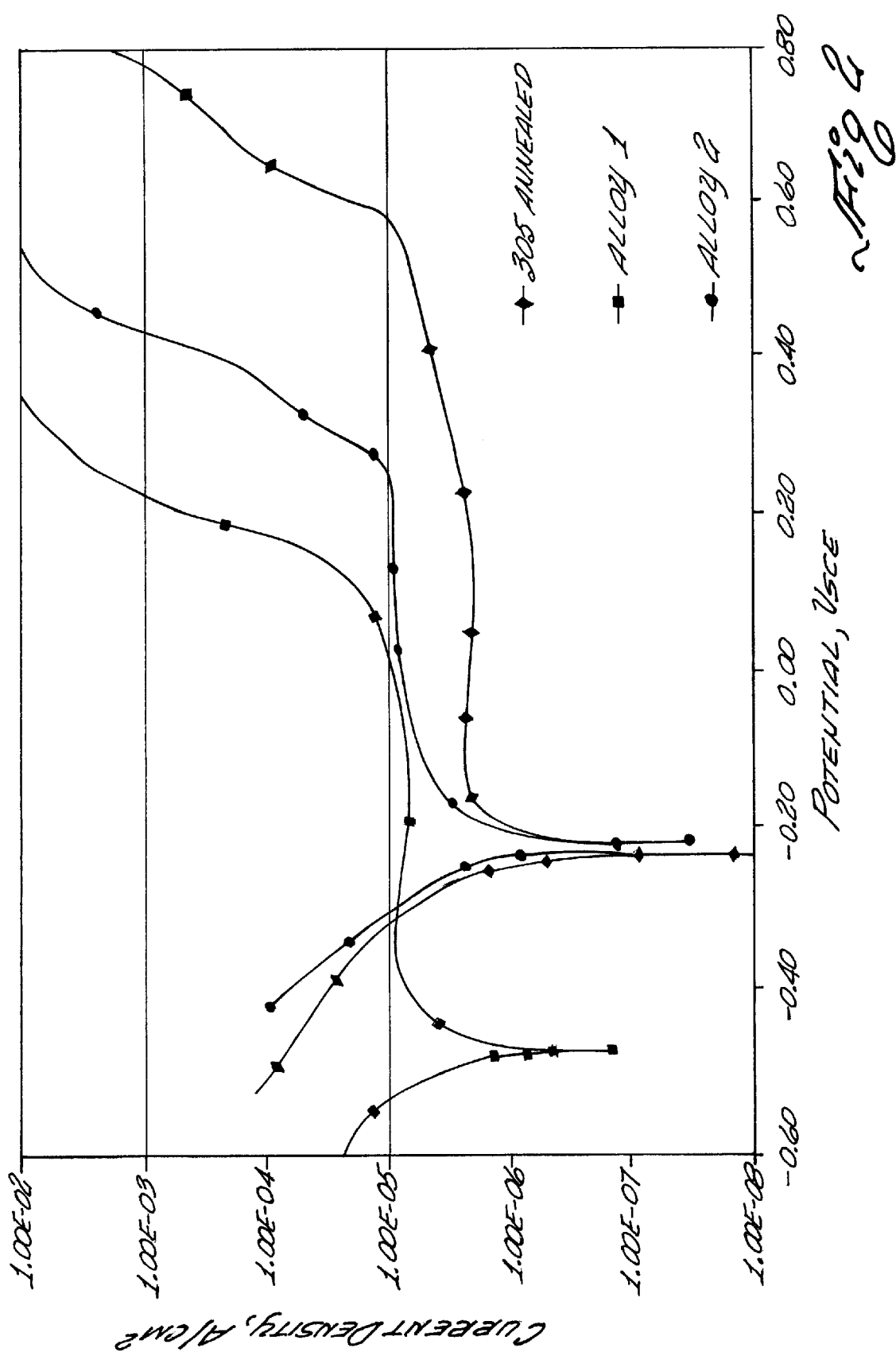
FIG. 2 is a graph of Current Density vs Potential illustrating the corrosion resistance of selected alloys in accordance with the present invention compared to Type 305 stainless steel.

To evaluate the corrosion potential for the alloys, cyclic electrochemical polarization testing was conducted in accordance with ASTM G-61 in 3.5% NaCl. Alloys were tested in the cold rolled condition and compared with a Type 305 annealed specimen. FIG. 2 shows a plot of the current density versus potential for duplicate runs of two alloys, Alloy 1 and Alloy 2 in accordance with the present invention, and 305 stainless steel. Alloy 1 is Fe-15Mn-12Cr-3Co-3Ni-0.IN and Alloy 2 $^{Fe-}$12Mn-12Cr8Ni-0.IN.

Figure 3:
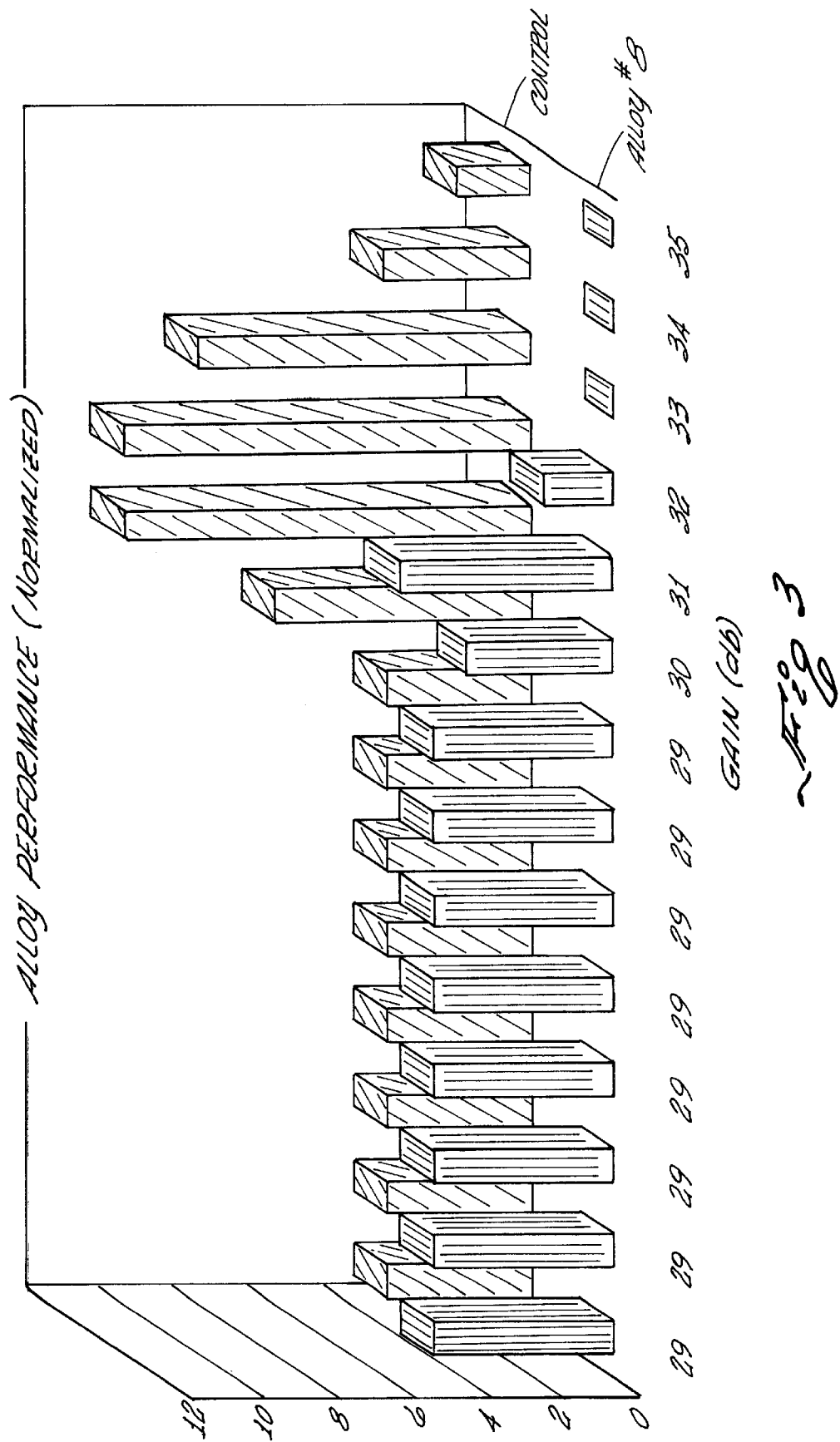
FIG. 3 is a histogram showing the damping capacity of Alloy 8 relative to a control alloy comprising 301 Stainless Steel.

Test data showing the relative damping capacity is presented in FIG. 3. In order to test the vibrational damping of a preferred alloy (Alloy 8) in accordance with the present invention, two groups of test arms were fabricated for comparative testing. The first test group (control) was made from 301 stainless steel in the full hard condition. The second test group was made from Alloy 8 (66.9Fe-15Mn-12Cr-3Ni-3Co-0.IN) having a dual-phase structure in accordance with a preferred embodiment of the alloy of the present invention. One end of each test arm was attached to the chuck of a shaker motor and the motion of the fixed end monitored by means of an accelerometer mounted on the chuck. The test arm was then stepped through a vibrational frequency range which includes the desired resonant frequency for the first bending mode of the test arm. The amplitude of motion of the opposing free end of the test arm was measured with a laser Doppler vibrometer. The frequency and amplitude (or gain, in dB) is recorded at the peak response of each test arm for the desired resonant mode. FIG. 3 is a histogram of the first bending resonant gain for each material type.

While particular embodiments of the present invention have been illustrated and described, it would be obvious to those skilled in the art that various other changes and modifications can be made without departing from the spirit and scope of the invention. For example, while the advantage of making particular flexures comprising a disk drive such as actuator arms and load beams, from alloy compositions in accordance with the present invention has been discussed, all such flexures used in a similar application are intended to be included within the scope of the invention. It is, therefore, intended to cover in the appended claims all such flexures and/or changes and modifications thereto as being within the scope of this invention.

What we claim is:

1. An alloy having the composition (X)Fe—(A)Mn—(B)Cr—(C)Si—(D) Ni—(E)Co—(F)N wherein A=15, B=12, C=0, D=3, E=3, F=0.1 and X=66.9, and wherein A, B, C, D, E, F and X represent the weight percent of the respective elements in the composition.

2. A disk drive suspension mounting arm comprised of an alloy having the composition (X)Fe—(A)Mn—(B)Cr—(C)Si—(D)Ni—(E)Co—(F)N wherein A=14–21, B=10–13, C=0–6, D=4–10, E=0–6, F=0–0.2 and X=100-(A+B+C+D+E+F), wherein A, B, C, D, E, F and X represent the weight percent of the respective elements in the composition.

3. A disk drive suspension mounting arm in accordance with claim 2 wherein A=15, B=12, C=0, D=3, E 3, F=0.1 and X=66.9.

4. A disk drive loadbeam comprised of an alloy having the composition (X)Fe—(A)Mn—(B)Cr—(C)Si—(D)Ni—(E)Co—(F)N wherein A=14–21, B=10–13, C=0–6, D=4–10, E=0–6, F=0–0.2 and X=100-(A+B+C+D+E+F), wherein A, B, C, D, E, F and X represent the weight percent of the respective elements in the composition.

5. A disk drive loadbeam in accordance with claim 4 wherein A=15, B=12, C=0, D=3, E=3, F=0.1 and X=66.9.

6. A disk drive actuator arm comprised of an alloy having the composition (X)Fe—(A)Mn—(B)Cr—(C)Si—(D)Ni—(E)Co—(F)N wherein A=14–21, B=10–13, C=0–6, D=4–10, E=0–6, F=0–0.2 and X=100-(A+B+C+D+E+F), wherein A, B, C, D, E, F and X represent the weight percent of the respective elements in the composition.

7. A disk drive actuator arm in accordance with claim 6 wherein A=15, B=12, C=0, D=3, E 3, F=0.1 and X=66.9.

8. A disk drive flexure comprised of an alloy having the composition (X)Fe—(A)Mn—(B)Cr—(C)Si—(D)Ni—(E)Co—(F)N wherein A=14–21, B=10–13, C=0–6, D=4–10, E=0–6, F=0–0.2 and X=100-(A+B+C+D+E+F), C, D, E, F and X represent the weight percent of the respective elements in the composition.

9. A disk drive flexure in accordance with claim 8 wherein A=15, B=12, C=0, D=3, E 3, F=0.1 and X=66.9.

* * * * *